UNITED STATES PATENT OFFICE.

JAKOB SAMUEL, OF BONN, GERMANY.

PROCESS FOR PREPARING ARTIFICIAL SAUSAGE-SKINS.

1,124,064. Specification of Letters Patent. Patented Jan. 5, 1915.

No Drawing. Application filed July 23, 1914. Serial No. 852,746.

*To all whom it may concern:*

Be it known that I, JAKOB SAMUEL, subject of the King of Prussia, German Emperor, residing at Bonn-on-the-Rhine, Germany, have invented certain new and useful Improvements in Processes for Preparing Artificial Sausage-Skins, of which the following is a specification.

Very various attempts have been made to replace animal intestines by means of artificial intestines for use as sausage skins, without hitherto any satisfactory result having been attained.

A principal drawback of the artificial sausage skins hitherto made consists in that they do not exactly conform to the movements of the sausage material, that is to say, that they do not sufficiently follow either the swelling of the sausage mass at the commencement, nor the contraction thereof after the drying. This is also the case when a fabric is employed as the skin which has been treated with a meat extract, consequently with an animal mass, so to speak, of dead material.

In the already known artificial skins, there occurs mostly the drawback that the artificial skin either bursts, or what happens most frequently, on the drying of the sausage mass, it forms folds.

The present invention relates to a method of forming artificial sausage skins which are free from the above-mentioned drawbacks, and moreover possess further advantages as hereinafter set forth.

The process consists in impregnating a receptive material of any suitable kind made in the form of the required skin, with fresh meat. This can for instance be done by grinding the meat while in the fresh state repeatedly until it assumes the form of a thin paste, and in treating a cylindrical envelop of fine muslin or the like with this paste and then drying it. The meat mass used for the impregnation can be further thinned in case of need by addition of a liquid of some kind, for instance, water, as also with a cementing material and it may also be treated with a preservative. As a diluting and cementing material the blood clot together with the serum obtained from the blood of freshly slaughtered animals is suitably employed. An artificial sausage skin prepared in this manner follows the movements of the sausage material because it consists like the material in great part of fresh meat, and therefore also reacts similar to the sausage meat. The skin does not burst and forms when the sausage material dries no folds, but adheres constantly intimately to the sausage mass. It therefore behaves in this respect at least as well as a natural sausage skin. But in contradistinction to the ordinary skin it possesses from a hygienic point of view, the great advantage that it is clean under all circumstances and can therefore introduce into the sausage no injurious matters. Further, in contradistinction to a natural skin, it may receive any desired form, thus for instance it may terminate conically at both ends, so that a smooth ending of the skin in the case of certain sausages which require this form, is easier than in the case of a natural skin. The skin prepared according to the process above set forth is also more easily smoked, because it consists in a certain measure of meat material and is moreover impenetrable to moisture and air.

As the basal material there may be used as above mentioned any material which will absorb finely divided meat, especially any textile material. If a textile such as muslin is used, then it must be so narrow meshed that the flesh material can continuously fill up the fine meshes. In such fabrics, the coating with the subdivided flesh material forms also at the same time an impregnation. It is also however possible that any particular material may only be coated with the flesh mass so that the latter is formed not in but upon the material in the form of a thin layer. This modification however is not preferred. But it is specially advantageous to utilize for holding the sausage material a woven envelop which is seamless.

Having now particularly described and ascertained the nature of my said invention and in what manner the same is to be performed, I declare that what I claim is:—

1. A process for making artificial sausage skins comprising the taking of a receptive fabric made in the form of the required skin and coating it with finely ground fresh meat made into a thin paste and drying the paste upon the fabric.

2. A process for making artificial sausage skins comprising the taking of a receptive fabric made in the form of the desired skin and coating it with finely ground fresh meat and blood clots made into a thin paste and drying said paste upon the fabric, as described.

3. A process for making artificial sausage skins comprising the taking of a receptive fabric made in the desired form of the skin and coating it with finely ground fresh meat, blood clots and blood serum made into a thin paste and drying said paste upon said fabric as described.

4. A process for making artificial sausage skins comprising the formation of a seamless woven envelop and coating the same with subdivided fresh meat made into a thin paste and then drying said paste upon said envelop.

In testimony whereof I affix my signature in presence of two witnesses.

JAKOB SAMUEL.

Witnesses:
UNIS VANDORY,
DESIDER VANDORY.